United States Patent [19]
Darnell

[11] 3,782,009
[45] Jan. 1, 1974

[54] BEHAVIOR MODIFICATION POINT BOARD

[76] Inventor: Eula K. Darnell, 307 Baldwin, West Helena, Ark. 72390

[22] Filed: Sept. 26, 1972

[21] Appl. No.: 292,451

[52] U.S. Cl. .............................................. 35/23 R
[51] Int. Cl. ............................................ G09b 1/02
[58] Field of Search ............... 35/23 R, 22 R, 24 R, 35/24 A, 24 B; 40/124.2, 124.4

[56] References Cited
UNITED STATES PATENTS

| | | | |
|---|---|---|---|
| 2,863,603 | 12/1958 | Doupnik | 35/22 R X |
| 3,035,355 | 5/1962 | Holmes | 35/23 R |
| 2,512,485 | 6/1950 | Cougias | 35/23 R |
| 733,834 | 7/1903 | Glidden | 35/24 R UX |
| 2,041,756 | 5/1936 | Gray | 40/124.2 |
| 3,207,421 | 9/1965 | Hunger et al. | 40/124.2 X |
| 3,490,162 | 1/1970 | Hill | 40/124.2 |

*Primary Examiner*—Wm. H. Grieb
*Attorney*—Hyman Berman et al.

[57] ABSTRACT

A device is described for keeping records of a point system for rewarding students for desirable classroom behavior and scholastic achievement. The device comprises a board having an outer sheet with open rectangular slots, elevated by a plurality of transversely extending ribs mounted on an inner sheet. The slots are arranged in rows and columns, each row corresponding to a student's name and each column corresponding to a particular behavior trait or scholastic achievement. At the leftmost portion of the outer sheet, is a column of slots designed to accept pockets bearing the name of the student, so that the students' names line up with each row of slots and the pockets fit within one another. Scoop drawers at the bottom of the board hold sticks of cardboard, or another suitable material, of various colors, representing points of gradated magnitudes. When a student has accomplished a particular scholastic achievement or fulfilled a desired behavior pattern, a stick of the appropriate point value is placed in the slot in the particular student's row in the column corresponding to the scholastic achievement or behavior trait. At the end of a day, all the student's markers, which he has accumulated, are then placed in his envelope, or exhanged for a marker of a larger denomination and placed in his envelope. The student's envelope will then contain an accumulation of points earned which, in accordance with the particular incentive system employed, may be exchanged for a treat or favor.

9 Claims, 7 Drawing Figures

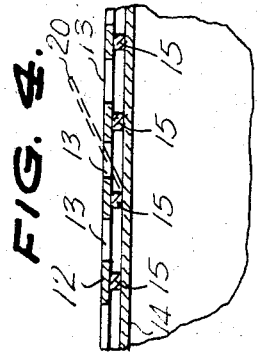
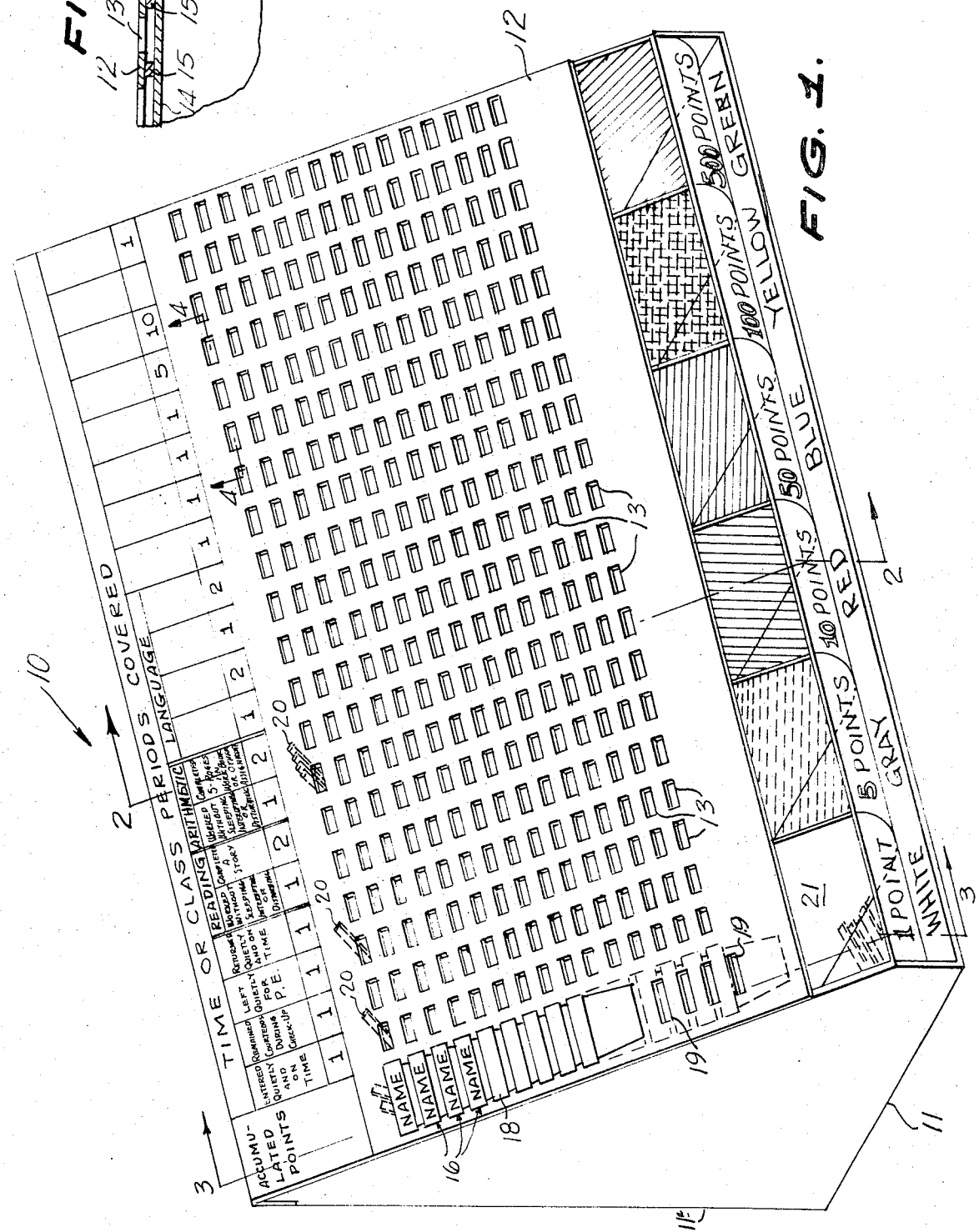

PATENTED JAN 1 1974

BEHAVIOR MODIFICATION POINT BOARD

FIELD OF THE INVENTION

This invention relates to educational devices and more particularly relates to a record keeping device for providing a visible and readily accessible cumulative storage of points earned by students in a social behavior and scholastic achievement incentive program.

BACKGROUND OF THE INVENTION

It has been found that in many classroom situations at the elementary school level, enhanced results in acquiring skills and developing desirable social attitudes can be achieved through an incentive program built around the concept of awarding points for completing a particular task or demonstrating for a prescribed time a desired social trait. The points awarded to each student under such a system, may then be accumulated until a predetermined number have been earned, at which point the student may trade the points in for a desired reward, such as permission to play a particular game during a classroom period or the like.

While the above-described incentive system has achieved notable results, particularly with slow learners or children having various personality problems, there has been no known device for enabling the teacher to readily and easily keep track of a student's earned cumulative point total and at the same time provide an attractive and readily observed display which is accessible to the students. Accordingly, it is a principal object of the present invention to provide a device for storing a student's cumulative point total in a point incentive system, while at the same time providing a simple record keeping means and indicating means for keeping track of the particular skills and behavior patterns achieved during a particular time period.

SUMMARY OF THE INVENTION

The invention essentially comprises a board which is mounted on a base, or stand, for ready viewing and which is provided with a plurality of rows and columns of slots. Each column of slots corresponds to a particular scholastic skill or behavior trait, while each row corresponds to the name of a particular student. A further column of slots is provided at the extreme left of the board for receiving pockets or cups which function as storage means for the students accumulated point markers and which bear the student's name on a portion in alignment with the rows of slots. Markers of varying colors, each color representing a predetermined point magnitude, are inserted in the slot adjacent a student's name and under the appropriate column, when that student has achieved a particular academic skill or demonstrated a desired behavior trait. The markers may then be removed from the slots at the end of the day, or some longer time period as desired, and inserted in the student's envelope or pocket. The markers will normally protrude from the slots and from the pockets, providing a ready visual indication of the number of points achieved. At an appropriate time, the accumulated points may be removed by the student from his pocket or envelope and traded in for a desired treat or favor, as described above.

BRIEF DESCRIPTION OF THE DRAWINGS

FIG. 1 is a perspective view of the behavior modification point board of the present invention;

FIG. 4 is a fragmentary sectional view taken on the line 4—4 in FIG. 1, looking in the direction of the arrows;

DETAILED DESCRIPTION OF THE INVENTION

Figure 2:
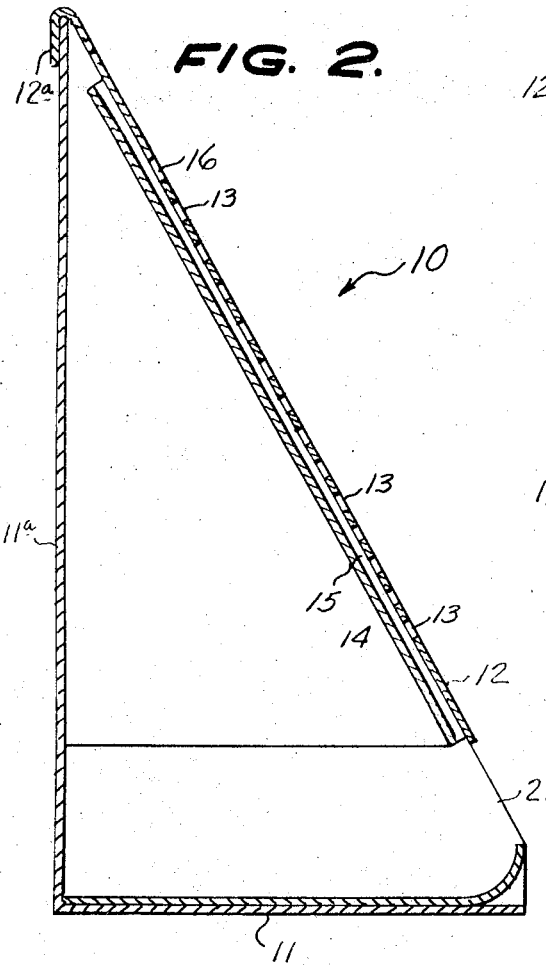
FIG. 2 is a transverse sectional view taken on the line 2—2 in FIG. 1, looking in the direction of the arrows.

Referring now to the drawings wherein like reference characters designate like parts throughout the several views thereof, there is shown the behavior modification point board of the present invention generally designated by the reference character 10. The board comprises a top sheet 12, formed of cardboard or the like, supported by a bottom sheet 14 having raised ribs 15 thereon, running from top to bottom, as viewed in FIG. 1. Bottom sheet 14 and ribs 15 may also be formed of cardboard, or the like. Top sheet 12 and bottom sheet 14 are taped or otherwise secured together at their edges.

Figure 5:
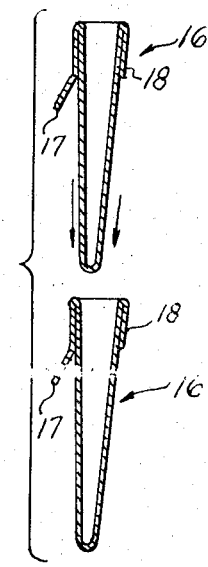
FIG. 5 is an exploded view, showing the manner in which two of the storage cups or pockets fit within one another.
Figure 6:
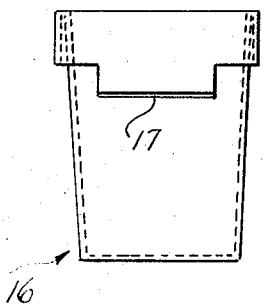
FIG. 6 is a rear elevational view of the cup or pocket, illustrating the means for securing it in a slot in the board.
Figure 7:
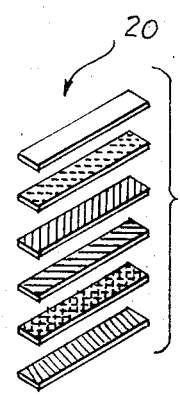
FIG. 7 is a perspective view of the various colored markers employed with the board of the present invention.

As can be seen best in FIG. 1, top sheet 12 comprises a plurality of slots 13 arranged in rows and columns. The leftmost column, as viewed in FIG. 1, comprises a plurality of slots 18, designed to receive the tab 17 of a cup 16, which cups are nestable in one another, as illustrated in FIG. 5. Each cup 16 has a border 18 on which the name of the student appears, so that when the cups are inserted in slots 18, as shown in FIG. 1, borders 18 will line up with the rows of slots 13.

At the upper portion of top sheet 12, there appears the pertinent printed information concerning the purpose for which the board is designed to be used. It should be realized, however, that the particular legends appearing at the top of the top sheet 12 are given by way of example and are in no sense limiting. As can be seen, the very top of the board will contain a legend designating the time or class for which that particular board is to be used. Each column of slots bears a legend designating the scholastic skill or character trait recorded as well as the number of points to be awarded for achieving the designated goal. At the left of the upper border, appears the legend "accumulated points," indicating the markers stored in cups 16.

Figure 3:
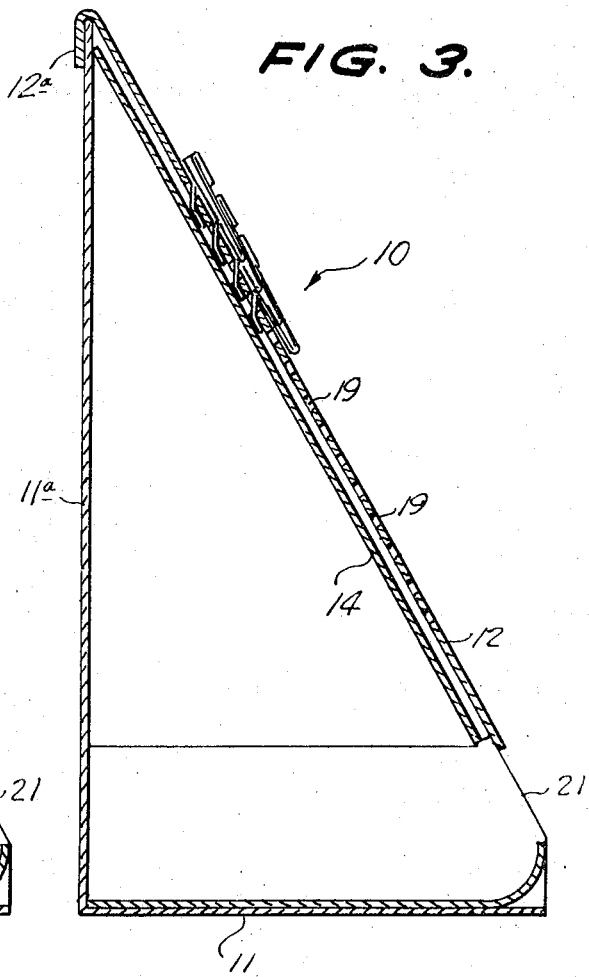
FIG. 3 is a transverse sectional view taken on the line 3—3 in FIG. 1, looking in the direction of the arrows.

As can be seen in FIG. 2 and 3, the board assembly, consisting of top sheet 12 and bottom sheet 14, may be hooked over upright portion 11a of base 11, by means of tab 12a to support the board in the position shown in FIG. 1. Located at the bottom of base 11 are open scoop drawers 21, each drawer containing a plurality of rectangular cardboard markers 20 of a different color. As indicated in FIG. 1, each colored marker designates a different earned point total. For example, a white marker designates one point, a gray marker designates five points, and so forth. In order to insert a marker in one of the slots 13, it is initially inserted in a vertical direction, as viewed in FIG. 1, and then rotated in a clockwise direction so that the end of the marker 20 abuts against rib 15, as seen best in FIG. 4. In this way, the markers are easily insertable, readily apparent to the viewer, and may be conveniently removed for storage in one of the cups 16. It should also be noted that when a large number of points have been accumulated in any one cup, or slot, markers of a smaller denomination may be removed and replaced by a larger denomination marker in order to conserve space.

In operation, the behavior modification point board of the present invention for a particular class or time period is set up on base 11 just before the class enters the room and all slots representing behavior factors, such as "entered quietly and on time," are filled with the appropriate marker for the designated point achievement at the beginning of the period, while the scholastic achievement slots, such as "completed five pages in work book," are left open. In this way, if a student fails to maintain the desired behavior trait for the expected period of time, his point markers can be removed, while when the student completes an assignment or achieves a desired scholastic goal, points allotted to that achievement can be inserted in place. At the close of each day or time period, the earned points may be removed from slots 13 and placed in cups 16 for each student. Thus, the students can readily observe what they have earned and have the accumulated points available to spend for special privileges or other rewards.

While a specific embodiment of the invention has been described, it will be realized by those skilled in the art that various modifications may be made therein without departing from the spirit and intent of the invention. It is, therefore, intended that the scope of the invention be defined only by the claims set forth hereinbelow.

I claim:

1. A device for recording and storing points earned for achieving predetermined behavioral and scholastic goals, comprising in combination:
   a. a board having a plurality of first groups of slots arranged in at least two substantially parallel columns;
   b. indicia at the top of each said column designating a predetermined goal;
   c. an additional column of a second group of slots parallel to said columns of first groups of slots;
   d. marker means readily insertable in and removable from said first groups of slots, each of said first slots being capable of retaining and displaying a plurality of markers therein; and
   e. means readily insertable in and removable from said second group of slots for storing and displaying said markers when transferred from said first groups of slots.

2. The device set forth in claim 1, wherein said slots are arranged in a plurality of columns and rows and further including indicia at the top of each column for designating a predetermined goal and indicia alongside each row for designating the name of an individual whose achievements are to be recorded.

3. The device set forth in claim 2, wherein said markers are of different colors, each color representing a predetermined point total and said means for storing comprises a separate means for storing each group of markers of a different color.

4. The device set forth in claim 2, wherein said means for storing accumulated markers comprises a plurality of nestable cups, each cup having means for engaging in one of said second slots.

5. The device set forth in claim 4, wherein each of said cups comprises indicia designating the name of an individual, said indicia being so disposed on said cup that when a cup is engaged in one of said slots, said indicia will line up with one of said rows of slots.

6. The device set forth in claim 1, wherein said device comprises a board having a top sheet bearing said indicia and containing said slots and a bottom sheet for supporting and raising said top sheet so as to enable said markers to be inserted in said slots.

7. The device set forth in claim 6, wherein said bottom sheet comprises a plurality of supporting ribs disposed parallel to said columns and located therebetween.

8. The device set forth in claim 7, further including means for removably supporting said board in a display position.

9. The device set forth in claim 8, wherein said support means comprises means for storing said markers when not in use.

* * * * *